(12) United States Patent
Zenasni et al.

(10) Patent No.: US 11,767,596 B2
(45) Date of Patent: Sep. 26, 2023

(54) OIL SOLUBLE MOLYBDENUM COMPLEXES FOR INHIBITING HIGH TEMPERATURE CORROSION AND RELATED APPLICATIONS IN PETROLEUM REFINERIES

(71) Applicant: Ecolab USA Inc., St. Paul, MN (US)

(72) Inventors: Oussama Zenasni, Houston, TX (US); Janelle Pennington, Missouri City, TX (US); Ramon Colorado, Jr., Stafford, TX (US); Philip Andrew Thornthwaite, Wigan (GB)

(73) Assignee: ECOLAB USA INC., St. Paul, MN (US)

( * ) Notice: Subject to any disclaimer, the term of this patent is extended or adjusted under 35 U.S.C. 154(b) by 298 days.

(21) Appl. No.: 16/942,194

(22) Filed: Jul. 29, 2020

(65) Prior Publication Data
US 2021/0032758 A1     Feb. 4, 2021

Related U.S. Application Data (60) Provisional application No. 62/879,817, filed on Jul. 29, 2019.

(51) Int. Cl.
| | | |
|---|---|---|
| *C10G 7/10* | (2006.01) | |
| *C23F 11/167* | (2006.01) | |
| *C23F 11/16* | (2006.01) | |
| *C10G 75/04* | (2006.01) | |
| *C10G 75/02* | (2006.01) | |

(52) U.S. Cl.
CPC ........ C23F 11/1673 (2013.01); C23F 11/165 (2013.01); *C10G 7/10* (2013.01); *C10G 75/02* (2013.01); *C10G 75/04* (2013.01)

(58) Field of Classification Search
CPC ...... C23F 11/1673; C23F 11/165; C10G 7/10; C10G 75/02; C10G 75/04; C07F 11/005
See application file for complete search history.

(56) References Cited

U.S. PATENT DOCUMENTS

| | | | |
|---|---|---|---|
| 3,356,702 A | 12/1967 | Farmer et al. | |
| 3,446,735 A | 5/1969 | Weise | |
| 3,522,093 A | 7/1970 | Woolman | |
| 4,024,050 A | 5/1977 | Shell et al. | |
| 4,024,051 A | 5/1977 | Shell et al. | |
| 4,226,700 A | 10/1980 | Broom | |
| 4,298,454 A | 11/1981 | Aldridge et al. | |
| 4,370,221 A | 1/1983 | Patmore et al. | |
| 4,428,848 A | 1/1984 | Levine et al. | |
| 4,511,405 A | 4/1985 | Reed et al. | |
| 4,542,253 A | 9/1985 | Kaplan et al. | |
| 4,551,227 A | 11/1985 | Porter et al. | |
| 4,559,152 A | 12/1985 | Schlicht | |
| 4,582,543 A | 4/1986 | Bretz | |
| 4,613,372 A | 9/1986 | Porter et al. | |
| 4,941,994 A | 7/1990 | Zetlmeisl et al. | |
| 5,000,836 A | 3/1991 | Forester | |
| 5,015,358 A | 5/1991 | Reed et al. | |
| 5,055,174 A | 10/1991 | Howell et al. | |
| 5,182,013 A | 1/1993 | Petersen et al. | |
| 5,252,254 A | 10/1993 | Babaian-Kibala | |
| 5,314,643 A | 5/1994 | Edmondson et al. | |
| 5,445,749 A | 8/1995 | Hong | |
| 5,552,085 A | 9/1996 | Babaian-Kibala | |
| 5,630,964 A | 5/1997 | Babaian-Kibala et al. | |
| 5,863,415 A | 1/1999 | Zetlmeisl | |
| 6,022,835 A | 2/2000 | Fletcher | |
| 6,207,625 B1 | 3/2001 | Ogano et al. | |
| 6,228,253 B1 | 5/2001 | Gandman | |
| 6,258,760 B1 | 7/2001 | Ozaki et al. | |
| 6,852,213 B1 | 2/2005 | Tong | |
| 7,311,144 B2 | 12/2007 | Conrad | |
| 7,727,942 B2 | 6/2010 | Wormuth et al. | |
| 7,763,744 B2 | 7/2010 | Tynik et al. | |
| 7,989,404 B2 | 8/2011 | Habeeb et al. | |
| 8,092,618 B2 | 1/2012 | Sharpe et al. | |
| 8,247,539 B2 | 8/2012 | Revel et al. | |
| 8,309,041 B2 | 11/2012 | Lott et al. | |
| 9,023,193 B2 | 5/2015 | Koseoglu | |
| 9,090,837 B2 | 7/2015 | Subramaniyam | |
| 9,115,319 B2 | 8/2015 | Subramaniyam | |
| 9,206,361 B2 | 12/2015 | Chabot et al. | |
| 9,233,359 B2 | 1/2016 | Borremans et al. | |
| 9,605,215 B2 | 3/2017 | Lott et al. | |
| 9,663,743 B2 | 5/2017 | Griffin et al. | |
| 9,790,440 B2 | 10/2017 | Chang | |
| 9,845,437 B2 | 12/2017 | Savage et al. | |
| 9,890,339 B2 | 2/2018 | Subramaniyam | |

(Continued)

FOREIGN PATENT DOCUMENTS

| | | | |
|---|---|---|---|
| CN | 1164867 A | * 11/1997 | ............. C10G 45/08 |
| CN | 101697038 A | 4/2010 | |

(Continued)

OTHER PUBLICATIONS

International Search Report for International Application No. PCT/US2021/043264, dated Nov. 10, 2021, 6 pages.

Written Opinion for International Application No. PCT/US2021/043264, dated Nov. 10, 2021, 11 pages.

De Feo, et al. (2017) "Formation of interfacial molybdenum carbide for DLC lubricated by MoDTC: Origin of wear mechanism", Wear, 370-371:17-28.

C. Grossiord, et al. (1998) "M0S2 single sheet lubrication by molybdenum dithiocarbamate", Tribology International, 31(12):737-743.

C. Grossiord, et al. (1998) "In situ MoS2 formation and selective transfer from MoDPT films", Surface and Coatings Technology, 108-109:352-359.

A. Morina, et al. (2006) "ZDDP and MoDTC interactions in boundary lubrication—The effect oftemperature and ZDDP/MoDTC ratio", Tribology International, 39:1545-1557.

(Continued)

*Primary Examiner* — Kumar R Bhushan
(74) *Attorney, Agent, or Firm* — Kagan Binder, PLLC (57) ABSTRACT

Disclosed are molybdenum-containing complexes used in compositions and methods for inhibiting or reducing high temperature corrosion in petroleum refineries.

12 Claims, 2 Drawing Sheets

(56) References Cited

U.S. PATENT DOCUMENTS

| | | | |
|---|---|---|---|
| 9,951,290 | B2 | 4/2018 | Gao et al. |
| 10,712,105 | B1 | 7/2020 | Christensen et al. |
| 2009/0176671 | A1 | 7/2009 | Ozaki et al. |
| 2010/0116718 | A1 | 5/2010 | Subramaniyam |
| 2010/0152073 | A1 | 6/2010 | Nelson et al. |
| 2010/0152074 | A1 | 6/2010 | Nelson et al. |
| 2011/0160405 | A1 | 6/2011 | Subramaniyam |
| 2014/0020645 | A1 | 1/2014 | Guinther et al. |
| 2014/0100148 | A1 | 4/2014 | Yagishita |
| 2016/0362619 | A1 | 12/2016 | Subramaniyam |
| 2017/0240838 | A1 | 8/2017 | Casey et al. |
| 2018/0100117 | A1 | 4/2018 | Flores-Torres et al. |
| 2019/0225909 | A1 | 7/2019 | Miller et al. |
| 2019/0264125 | A1 | 8/2019 | Iino et al. |
| 2021/0032528 | A1 | 2/2021 | Gul et al. |
| 2022/0017836 | A1 | 1/2022 | Isa et al. |
| 2022/0033725 | A1 | 2/2022 | Zenasni et al. |
| 2022/0033977 | A1 | 2/2022 | Gul et al. |

FOREIGN PATENT DOCUMENTS

| | | | | |
|---|---|---|---|---|
| CN | 104730602 | A | 6/2015 | |
| CN | 105482869 | A | 4/2016 | |
| CN | 106010480 | A * | 10/2016 | ............ C09K 8/035 |
| DE | 2840094 | A1 | 3/1980 | |
| EP | 0267674 | A1 | 5/1988 | |
| EP | 0727429 | A2 | 8/1996 | |
| EP | 0768366 | A1 | 4/1997 | |
| EP | 1046700 | A2 | 10/2000 | |
| EP | 1870706 | A1 * | 12/2007 | ............ B01J 45/00 |
| EP | 2687582 | A1 | 1/2014 | |
| EP | 2716743 | A1 | 4/2014 | |
| JP | H0646243 | U | 6/1994 | |
| WO | 98/33869 | A1 | 8/1998 | |
| WO | 2011/161982 | A1 | 12/2011 | |
| WO | 2021/021888 | A1 | 2/2021 | |
| WO | 2021021891 | A1 | 4/2021 | |
| WO | 2022/026434 | A1 | 2/2022 | |
| WO | 2022/026436 | A1 | 2/2022 | |
| WO | 2020/105702 | A1 | 5/2022 | |

OTHER PUBLICATIONS

O.P. Parenago, et al. (2017) "Sulfur-Containing Molybdenum Compounds as High-Performance Lubricant Additives (Review)", Petroleum Chemistry, 57(8):631-642.

T. Sakurai, et al. (1971) "The Synthesis of Di-μ-thio-dithio-bis(dialkyldithiocarbamates) Dimolybdenum (V) and Their Effects on• Boundary Lubrication", Bulletin of The Japan Petroleum Institute, 13(2):243-249.

R. Sarin, et al. (1994) "Molybdenum dialkylphosphorodithioates:synthesis and performance evaluation as multifunctional additives for lubricants", Tribology International, 27(6):379-386.

L. Yan, et al. (2012) "Comparing tribological behaviors of sulfur- and phosphorus-free organomolybdenum additive with ZDDP and MoDTC", Tribology International, 53:150-158.

Babaian-Kibala (1994) "Phosphate ester inhibitors solve naphthenic acid corrosion problems", Oil & Gas Journal, 92(9), 9 pages, (Abstract).

International Search Report for International Application No. PCT/US2020/044009, dated Oct. 14, 2020, 7 pages.

Written Opinion for International Application No. PCT/US2020/044009, dated Oct. 14, 2020, 8 pages.

Oung et al. (1998) "Mitigating steel corrosion in cooling water by molybdate based inhibitors", Corrosion Prevention and Control. 45. 156-162 (Abstract only).

Written Opinion for International Application No. PCT/US2020/044005, dated Oct. 13, 2020, 8 pages.

International Search Report for International Application No. PCT/US2020/044005, dated Oct. 13, 2020, 6 pages.

International Search Report for International Application No. PCT/US2021/043267, dated Oct. 28, 2021, 6 pages.

Written Opinion for International Application No. PCT/US2021/043267, dated Oct. 28, 2021, 9 pages.

* cited by examiner

OIL SOLUBLE MOLYBDENUM COMPLEXES FOR INHIBITING HIGH TEMPERATURE CORROSION AND RELATED APPLICATIONS IN PETROLEUM REFINERIES

CROSS REFERENCE TO RELATED APPLICATIONS

This application claims the benefit of U.S. Provisional Patent Application Ser. No. 62/879,817, filed Jul. 29, 2019, the disclosure of which is incorporated in its entirety herein by reference.

FIELD

The application is directed at inhibiting high temperature corrosion.

BACKGROUND

High temperature corrosion (e.g. 175° C. to 600° C.) is a well-known problem in processing and refining crude oil and related fractions. The oil's acidity, which is caused primarily by high naphthenic acid levels, adds to the corrosion problem as does the presence of sulfur in the crude oil, which produces hydrogen sulfide or reactive sulfur species at higher temperatures.

Petroleum refineries that process high acid crudes use advances in the metallurgical materials to address corrosion, whereas other petroleum refineries use corrosion inhibitors of various chemistries to prevent or reduce corrosion and its accompanying adverse effects.

However, these options are not without their problems. Therefore, there continues to be a need for corrosion inhibiting compositions and methods that are effective and minimize operating costs, particularly against naphthenic acids and sulfur at high temperature. There is also a need for corrosion inhibitors that have reduced phosphorus or no phosphorous. Phosphorus-containing complexes are known to impair the function of various catalyst used in the processing of crude oil.

SUMMARY

Described herein are compositions and methods for inhibiting high temperature corrosion in fluid sources comprising corrodents and at least a liquid hydrocarbon.

In one aspect of the application is a method of inhibiting corrosion comprising:
introducing into a fluid source containing corrodents at least one molybdenum-containing complex having the formula selected from Formula I, II, III, or IV.

Formula I

Formuila II wherein $R_1$, $R_2$, $R_3$, and $R_4$, are each a hydrocarbon group and wherein $R_1$, $R_2$, $R_3$, and $R_4$ can be the same or different; and X is oxygen or sulfur and X can be the same or different.

Formula III

Formuila IV wherein $Y^1$ and $Y^2$ are each oxygen, nitrogen or carbon-containing ligands such as alcohols, alkyl or alkenyl groups, amides, amines, or aryl groups, and $Y^1$ and $Y^2$ can be the same or different and X is each oxygen or sulfur, and X can be the same of different from each other.

In another aspect of the invention is a composition comprising at least one molybdenum-containing complex to inhibit corrosion in a fluid source containing corrodents and in contact with a metal containment, the at least one molybdenum-containing complex comprising the formula selected from Formula I, II, II or IV:

Formula I

Formuila II wherein $R_1$, $R_2$, $R_3$, and $R_4$, are each a hydrocarbon group and wherein $R_1$, $R_2$, $R_3$, and $R_4$ can be the same or different; and X is oxygen or sulfur and X can be the same or different.

Formula III

Formuila IV wherein $Y^1$ and $Y^2$ are each oxygen, nitrogen or carbon-containing ligands such as alcohols, alkyl or alkenyl groups, amides, amines, or aryl groups, and $Y^1$ and $Y^2$ can be the same or different and X is each oxygen or sulfur, and X can be the same of different from each other.

In yet another aspect of the application is a treated metal containment comprising a metal containment comprising a metal surface; and the fluid source comprising the molybdenum-containing complex as described in Formula I, II, II and IV, wherein at least a portion of the metal surface is contacted by the fluid source.

The molybdenum-containing complex is used to inhibit corrosion of a metal containment comprising a fluid source comprising one or more corrodents, in particular corrodents with a high acidity and in process that include high temperatures (e.g. 175° C. to 600° C.).

DETAILED DESCRIPTION

Although the present disclosure provides references to various embodiments, persons skilled in the art will recognize that changes may be made in form and detail without departing from the spirit and scope of the invention. Various embodiments will be described in detail with reference to the figures. Reference to various embodiments does not limit the scope of the claims attached hereto. Additionally, any examples set forth in this specification are not intended to be limiting and merely set forth some of the many possible embodiments for the appended claims.

Unless otherwise defined, all technical and scientific terms used herein have the same meaning as commonly understood by one of ordinary skill in the art. In case of conflict, the present document, including definitions, will control. Methods and materials are described below, although methods and materials similar or equivalent to those described herein can be used in practice or testing of the various embodiments of the present invention. All publications, patent applications, patents and other references mentioned herein are incorporated by reference in their entirety.

As used herein, the term "corrodents," are materials that cause, initiate, catalyze, accelerate, induce, or otherwise promote the corrosion of metals.

As used herein, the term "corrosion inhibitor" (CI) means a complex or mixture that prevents, retards, mitigates, reduces, controls and/or delays corrosion.

As used herein, the term "fluid source" means any fluid source used in operations in the petroleum industries (viz., petroleum transport, storage, and refining) that contain one or more corrodents.

As used herein, the term "inhibits," "inhibiting," or grammatical equivalents thereof refer to preventing, retarding, mitigating, reducing, controlling and/or delaying corrosion.

The term "naphthenic acid" as used in connection with corrosion refers to monocyclic or bicyclic carboxylic acid with a boil range between 176° C. (350° F.) and 343° C. (650° F.). These acids tend to concentrate in the heavier fractions during crude distillation. Naphthenic acid is a collective term for certain organic acids present in various crude oils. Although there may be present minor amounts of other organic acids, it is understood that the majority of the acids in a naphthenic based crude are naphthenic in character, i.e., with a saturated ring, unsaturated ring, or aliphatic chain structure as follows:

As used herein, the term "passivation" means the prevention of a reaction between two materials when used together by coating at least one of the two materials to such an extent that they become substantially less reactive relative to each other As used herein, the terms "comprise(s)," "include(s)," "having," "has," "can," "contain(s)," and variants thereof are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

As used herein, the term "optional" or "optionally" means that the subsequently described event or circumstance may but need not occur, and that the description includes instances where the event or circumstance occurs and instances in which it does not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making complexes, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities. Further, where "about" is employed to describe a range of values, for example "about 1 to 5" the recitation means "1 to 5" and "about 1 to about 5" and "1 to about 5" and "about 1 to 5" unless specifically limited by context.

As used herein, the term "substantially" means "consisting essentially of" and includes "consisting of" "Consisting essentially of" and "consisting of" are construed as in U.S. patent law. For example, a solution that is "substantially free" of a specified complex or material may be free of that complex or material, or may have a minor amount of that complex or material present, such as through unintended contamination, side reactions, or incomplete purification. A "minor amount" may be a trace, an unmeasurable amount, an amount that does not interfere with a value or property, or some other amount as provided in context. A composition that has "substantially only" a provided list of components may consist of only those components, or have a trace amount of some other component present, or have one or more additional components that do not materially affect the properties of the composition. Additionally, "substantially" modifying, for example, the type or quantity of an ingredient in a composition, a property, a measurable quantity, a method, a value, or a range, employed in describing the embodiments of the disclosure, refers to a variation that does not affect the overall recited composition, property, quantity, method, value, or range thereof in a manner that negates an intended composition, property, quantity, method, value, or range. Where modified by the term "substantially" the claims appended hereto include equivalents according to this definition.

As used herein, any recited ranges of values contemplate all values within the range and are to be construed as support for claims reciting any sub-ranges having endpoints which are real number values within the recited range. By way of example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5 and anything there between.

Described are compositions and methods to inhibit corrosion in hydrocarbon fluid sources that are formed during crude oil refining processes; especially, processing and refining of oils at temperatures in the range from about 175° C. to about 600° C., and that have corrodents. The acidity may be due to the presence of naphthenic acid, sulfur compounds, or both. Corrosion is extremely aggressive and difficult to inhibit in the presence of the naphthenic acid, sulfur, at high temperature or a combination thereof.

The compositions may be applied to one or more liquid hydrocarbon products to inhibit or reduce corrosion in petroleum transport, storage, and refining equipment such as pipes, transfer lines, valves, and the like. The corrosion inhibiting composition includes at least one molybdenum-containing complex. The molybdenum-containing complex contains at least one molybdenum center that is coordinated to phosphorous, sulfur, or oxygen bearing ligands including thiophosphates, phosphates, alkoxides, carbamates, thiocarbamates or polymers thereof. In some embodiments, the molybdenum-containing complex is a metal containing complex. The described compositions and methods inhibit corrosion by serving as an anticorrosion inhibitor, or to passivate a surface against corrosion or both.

In some embodiments, the molybdenum-containing complex has the general formula of Formula I or II.

Formula I

Formula II wherein $R_1$, $R_2$, $R_3$, and $R_4$, are each a hydrocarbon group and wherein $R_1$, $R_2$, $R_3$, and $R_4$ can be the same or different; and X is oxygen or sulfur, and X can be the same or different.

In some embodiments, $R_1$, $R_2$, $R_3$, and $R_4$, are each an alkyl group having 2 to 30 carbon atoms; 5 to 18 carbon atoms; 5 to 12 carbon atoms; having 6 to 10 carbon atoms or an aryl group (including alkylaryl group) having 6 to 18 carbon atoms. In some embodiments the number of carbon atoms described for the alkyl groups are characterized by one or more hydroxyl groups (e.g. alkyl alcohols). Examples of the alkyl group include ethyl, propyl, butyl, pentyl, hexyl, heptyl, octyl, nonyl, decyl, undecyl, dodecyl, tridecyl, tetradecyl, pentadecyl, hexadecyl, heptadecyl and octadecyl groups. These alkyl groups may be primary, secondary or tertiary alkyl groups and straight-chain or branched. Examples of the (alkyl)aryl groups include phenyl, tolyl, ethylphenyl, propylphenyl, butylphenyl, pentylphenyl, hexylphenyl, octylphenyl, nonylphenyl, decylphenyl, undecylphenyl, and dodecylphenyl groups, all of which alkyl groups may be primary, secondary or tertiary alkyl groups and straight-chain or branched. Furthermore, the (alkyl)aryl groups include all positional isomers wherein the aryl group may possess an alkyl substituent at any position.

In some embodiments, the $R_1$, $R_2$, $R_3$, and $R_4$, are each the alkoxides, thiolates, or phenoxides, phosphates, thiophosphates and polymers thereof such as polythiophosphate. In some embodiments, the molybdenum-containing complex is a molybdenum dithiophosphate.

In some embodiments, the molybdenum-containing complex is a sulfurized molybdenum dithiophosphate. In some embodiments the sulfurized molybdenum dithiophosphates are sulfurized molybdenum diethyldithiophosphate, sulfurized molybdenum dipropyldithiophosphate, sulfurized molybdenum dibutyldithiophosphate, sulfurized molybdenum dipentyldithiophosphate, sulfurized molybdenum dihexyldithiophosphate, sulfurized molybdenum dioctyldithiophosphate, sulfurized molybdenum didecyldithiophosphate, sulfurized molybdenum didodecyldithiophosphate, sulfurized molybdenum di(butylphenyl)dithiophosphate, sulfurized molybdenum di(nonylphenyl)dithiophosphate, sulfurized oxymolybdenum diethyldithiophosphate, sulfurized oxymolybdenum dipropyldithiophosphate, di(2-ethylhexyl); dithiophosphate; sulfurized oxymolybdenum dibutyldithiophosphate, sulfurized oxymolybdenum dipentyldithiophosphate, sulfurized oxymolybdenum dihexyldithiophosphate, sulfurized oxymolybdenum dioctyldithiophosphate, sulfurized oxymolybdenum didecyldithiophosphate, sulfurized oxymolybdenum didodecyldithiophosphate, sulfurized oxymolybdenum di(butylphenyl)dithiophosphate, sulfurized oxymolybdenum di(nonylphenyl)dithiophosphate, all of which the alkyl groups may be straight-chain or branched and the alkyl groups may bond to any position of the phenyl groups, and mixtures thereof.

In other embodiments, molybdenum containing complex is molybdenum dialkyl diphosphate; where the alkyl chains are a variation of the above-mentioned structures. In other embodiments is non-phosphorous molybdenum complexes in the form of molybdenum alkyloxides, molybdenum hydroxy-terminated amide complexes, in which the alkyl groups may be straight-chain or branched and the alkyl groups may bond to any position of the phenyl groups, and mixtures thereof.

In some embodiments, the molybdenum-containing complex has the general formula of Formula III or IV.

Formula III

Formula IV wherein $Y^1$ and $Y^2$ are each oxygen, nitrogen or carbon-containing ligands (viz., alcohols, alkyl or alkenyl groups, amides, amines, or aryl groups) and $Y^1$ and $Y^2$ can be the same or different; and X is each oxygen or sulfur, and X can be the same of different from each other.

In some embodiments at least one $Y^1$ or $Y^2$ is an amine. In some embodiments the molybdenum-containing complex is a molybdenum dithiocarbamate.

In some embodiments, the alkyl group is ethyl, propyl, butyl, pentyl, hexyl, heptyl, octyl, nonyl, decyl, undecyl, dodecyl, tridecyl, tetradecyl, pentadecyl, hexadecyl, heptadecyl and octadecyl groups. These alkyl groups may be primary, secondary or tertiary alkyl groups and straight-chain or branched. In some embodiments the (alkyl)aryl groups include phenyl, tolyl, ethylphenyl, propylphenyl, butylphenyl, pentylphenyl, hexylphenyl, octylphenyl, nonylphenyl, decylphenyl, undecylphenyl, and dodecylphenyl groups, all of which alkyl groups may be primary, secondary or tertiary alkyl groups and straight-chain or branched. Furthermore, the (alkyl)aryl groups include all positional isomers wherein the aryl group may possess an alkyl substituent at any position.

In some embodiments, the alcohol groups may be mono-substituted alcohols, diols or bis-alcohols, or polyalcohols. In some embodiments the alcohols are six to ten carbon atoms. In some embodiments, the amino groups may be monoamines, diamines, or polyamines. In some embodiments, the amine is a dialkyl amine with the formula $HNR^5R^6$, where $R^5$ and $R^6$ are each selected from straight or branched chains containing 2 to 24 carbon atoms, or from 4-13; 8 to 13; or 10 to 20 carbon atoms. $R^5$ can be the same or different from $R^6$. In some embodiments, the $R^5$ and $R^6$ can be an aryl group including an (alkyl)aryl group. In some embodiments the alkyl group is ethyl, propyl, butyl, pentyl, hexyl, heptyl, octyl, nonyl, decyl, undecyl, dodecyl, tridecyl, tetradecyl, pentadecyl, hexadecyl, heptadecyl and octadecyl groups. These alkyl groups may be primary, secondary or tertiary alkyl groups and straight-chain or branched.

In some embodiments the molybdenum-containing complex is a sulfurized molybdenum dithiocarbamates. In other embodiments, the sulfurized molybdenum dithiocarbamates are sulfurized molybdenum diethyldithiocarbamate, sulfurized molybdenum dipropyldithiocarbamate, sulfurized molybdenum dibutyldithiocarbamate, sulfurized molybdenum dipentyldithiocarbamate, sulfurized molybdenum dihexyldithiocarbamate, sulfurized molybdenum dioctyldithiocarbamate, sulfurized molybdenum didecyldithiocarbamate, sulfurized molybdenum didodecyldithiocarbamate, sulfurized molybdenum di(butylphenyl)dithiocarbamate, sulfurized molybdenum di(nonylphenyl)dithiocarbamate, sulfurized oxymolybdenum diethyldithiocarbamate, sulfurized oxymolybdenum dipropyldithiocarbamate, sulfurized oxymolybdenum dibutyldithiocarbamate, sulfurized oxymolybdenum dipentyldithiocarbamate, sulfurized oxymolybdenum dihexyldithiocarbamate, sulfurized oxymolybdenum dioctyldithiocarbamate, sulfurized oxymolybdenum didecyldithiocarbamate, sulfurized oxymolybdenum didodecyldithiocarbamate, sulfurized oxymolybdenum di(butylphenyl)dithiocarbamate, and sulfurized oxymolybdenum di(nonylphenyl)dithiocarbamate, all of which the alkyl groups may be straight-chain or branched and the alkyl groups may bond to any position of the phenyl groups, and mixtures thereof. In other embodiments, molybdenum complexes are sulfurized molybdenum dithiolates, sulfurized molybdenum dithioester, or sulfurized molybdenum thio-terminated amide complexes, all of which the alkyl groups may be straight-chain or branched and the alkyl groups may bond to any position of the phenyl groups, and mixtures thereof In some embodiments, the molybdenum-containing complexes are phosphorous- or sulfur-free. Examples of sulfur- and phosphorus-free molybdenum include molybdenum trioxide, ammonium molybdate, sodium molybdate and potassium molybdate.

In some embodiments, the molybdenum dithiophosphate includes molybdenum dialkyl (or diaryl) dithiophosphate such as molybdenum diisopropyldithiophosphate, molybdenum di-(2-ethylhexyl) dithiophosphate and molybdenum di-(nonylphenyl) dithiophosphate. Molybdenum dithiocarbamates includes molybdenum dialkyldithiocarbamate such as molybdenum dibutyldithiocarbamate, molybdenum di-(2-ethylhexyl) dithiocarbamate and molybdenum dilauryldithiocarbamate.

In some embodiments, the molybdenum-containing complex is a thiocarbamate, phosphate or thiophosphate based and polymers thereof and mixtures thereof.

In some embodiments, the molybdenum-containing complex that has little or no phosphorus provides a longer catalyst life for the catalysts used in hydrocarbon treating processes, since such molybdenum-containing complex minimizes the negative effect of phosphorus on catalysts used in petroleum refineries.

The compositions and methods described herein are used to inhibit corrosion. In some embodiments, compositions comprise, consist essentially of, or consist of at least one of the described molybdenum-containing complexes used for corrosion inhibition.

The corrosion inhibiting activity of the molybdenum-containing complexes are especially useful in liquid hydrocarbons and petrochemicals during the processing thereof where the process temperature is elevated to about 175° C. to 600° C. In some embodiments, the molybdenum-containing complexes are used at process temperatures of 175° C. to 550° C.; 175° C. to 205° C.; 200° C. to 300° C.; or from 200° C. to 450° C.; or 250° C. to 350° C.

In some embodiments, the molybdenum-containing complexes are used to inhibit corrosion of metal containments or equipment that contacts fluid sources containing corrodents. In some embodiments, the molybdenum-containing complexes are used with a fluid source that is acidic. In some embodiments, the acidity is due at least in part by the presence of corrodents such as naphthenic acid or other similar organic acids or phenols such as cresylic acid. In some embodiments, the corrodents include naphthenic acid, sulfur (e.g. hydrogen sulfide, organic sulfides, mercaptans, or sulfur dioxide), carbon dioxide, oxygen, sodium chloride, calcium chloride, or combination thereof. In some embodiments, the fluid source comprises water, gas, liquid hydrocarbon or combinations thereof. In some embodiments, the fluid source is a non-aqueous liquid. In some embodiments, the fluid source is a gas oil and light lubricating oil fractions. In some embodiments, the molybdenum-containing complexes are used to inhibit corrosion of a fluid source that includes a gas oil and light lubricating oil fractions having corrodents that include naphthenic acid, sulfur (e.g. hydrogen sulfide, organic sulfides, mercaptans or sulfur dioxide), carbon dioxide, oxygen, sodium chloride, calcium chloride, or combination thereof and is at a temperature higher than 175° C.

In some embodiments, the method comprises introducing a corrosion inhibiting composition to metal containment or the metal surface. In some embodiments the metal surface (e.g., surfaces of metal pipes, tubes, tanks, and the like) is introduced with a composition that includes at least a molybdenum-containing complex. In some embodiments, the metal surface is any suitable metal or metal alloy. For example, the metal surface can include steel (including stainless steel, galvanized steel, hot dipped galvanized steel, electrogalvanized steel, annealed hot dipped galvanized steel, carbon steel (e.g. mild carbon steel)), nickel, titanium, tantalum, aluminum, copper, gold, silver, platinum, zinc, nickel titanium alloy (nitinol), an alloy of nickel, chromium, iron, iridium, tungsten, silicon, magnesium, tin, alloys of any of the foregoing metals, coatings containing any of the foregoing metals, and combinations thereof. In some embodiments, the metal surface is carbon (mild) steel or higher alloys.

In some embodiments, the metal containment is a tank, pipe, or other apparatus having a metal surface in contact with a fluid source, or potentially in contact with a fluid source, wherein the fluid source includes one or more corrodents and is at a temperature between 175° C. to 600° C. In other embodiments, molybdenum-containing complex is introduced into distillation columns, trays, piping (e.g. pumparound) and related equipment. In some embodiments, the molybdenum-containing complex is used to inhibit the corrosive effects of naphthenic acids, sulfur or both in distilling hydrocarbons without the need for expensive corrosion resistant alloys to be used in distillation columns, strippers, trays, pumparound piping, and related equipment.

While the gas oil and light lubricating oil fractions often contain naphthenic acid, which contributes to the corrosion problem and in which context the molybdenum-containing complex is described, the molybdenum-containing complexes are useful not only in inhibiting corrosion in a part of a refinery handling these petroleum intermediates but are useful throughout an oil refinery where acidic hydrocarbons are in contact with metal-containing surfaces (e.g. iron-containing surfaces) and at high temperatures of 175° C. 600° C.

Any method known to one of skill in the art may be used to prepare the molybdenum-containing complexes. For example, the molybdenum-containing complex may be prepared as described in Tribology International Vol. 27, Issue 6, p. 379-386 (1994); Tribology International Vol. 53, p. 150-158 (2012), and U.S. Pat. No. 3,356,702, the references incorporated herein by reference in their entireties.

In some embodiments, the corrosion inhibiting composition includes solvents suitable for formulation of the molybdenum-containing complex. In some embodiments, the solvents are water, brine, seawater, alcohols such as methanol, ethanol, isopropanol, n-propanol, n-butanol, isobutanol, sec-butanol, t-butanol or higher alcohols such as benzyl alcohol); ketones such as acetone, or methyl ethyl ketone (2-butanone); acetonitrile; esters such as ethyl acetate, propyl acetate and butyl acetate; ethers such as diethyl ether or higher, e.g. methyl t-butyl ether, glyme, diglyme, ethylene glycol monobutyl ether, ethylene diglycol ethyl ether, 1,4 dioxane and related; aromatics such as toluene, xylene(s), diethylbenzene, naphthalene and related aromatics or refinery cuts (heavy aromatic naphtha, heavy aromatic distillates, and related); aliphatics such as pentane, hexane, heptane, octane, or refined gasoline; or several "green" solvents such as 2-methyltetrahydrofuran, furfural alcohol, and cyclopentylmethylether.

In some embodiments, the solvents suitable for formulation with the molybdenum-containing composition are aliphatic, such as pentane, hexane, cyclohexane, methylcyclohexane, heptane, decane, dodecane, and the like, and aromatics, such as toluene, xylene, heavy aromatic naphtha, diesel, fatty acid derivatives (acids, esters, amides), and the like.

In some embodiments the one or more solvents are 10 wt % to 99 wt % of the corrosion inhibiting composition; 1-25 wt %; 20-50 wt %; 30-75 wt %; 50-75%; 75-100 wt % of the corrosion inhibiting composition.

In some embodiments, the molybdenum-containing complexes are provided neat (viz., without a solvent).

In some embodiments, the molybdenum-containing complexes are provided as a concentrate. In some embodiments the method includes introducing a molybdenum-containing concentrate directly to a metal containment in an amount that results in 0.1 ppm to 10,000 ppm (by weight or by volume) of the molybdenum-containing complexes in the fluid source. In other embodiments the method further includes diluting a molybdenum-containing complex concentrate prior to the introducing. The diluting comprises, consists essentially of, or consists of combining a molybdenum-containing complex concentrate with a diluent, wherein the diluent comprises, consists essentially of, or consists of hydrocarbon-based solvent, a hydrocarbon source, a hydrocarbon soluble solvent, or a mixture of two or more thereof; and optionally includes mixing the molybdenum-containing complex concentrate with the diluent prior to the introducing of the molybdenum-containing complexes to the fluid source.

In some embodiments, the pH of the fluid source is less than 7. In some embodiments, the pH of the fluid source is between about 1 and about 6, between 5 and 6, between 4 and 5, between 3 and 4, between 2 and 3, between 1 and 2, or between 0 and 1.

In some embodiments, various dosage amounts of the corrosion inhibiting composition and/or the molybdenum-containing complex are introduced to a fluid source to inhibit corrosion of a metal containment in contact with the fluid source. The most effective corrosion inhibitor amount or mixture of inhibitors to be used can vary, depending on the local operating conditions, the particular hydrocarbon being processed, the temperature and other characteristics of the acid corrosion system can have a bearing on the amount of the corrosion inhibitor or mixture of corrosion inhibitors to be used. One of ordinary skill in the art is able to calculate the amount of the molybdenum-containing complex or composition comprising molybdenum-containing complex for a given situation without undue experimentation. Other factors that would be considered important in such calculations include, for example, content of corrodents in fluid source, naphthenic acid amount, or acid, and similar parameters.

In some embodiments, the composition comprising the molybdenum-containing complex is applied to a fluid source that contains various acid levels. In some embodiments, the hydrocarbon contains naphthenic acids.

A method used to determine the acid concentration in crude oil has been a potassium hydroxide (KOH) titration of the oil. The oil is titrated with KOH, a strong base, to an end point which assures that all acids in the sample have been neutralized. The unit of this titration is mg of KOH/gram of sample and is referred to as the "Total Acid Number" (TAN) or Neutralization Number. Both terms are used interchangeably in the application.

The unit of TAN is commonly used since it is not possible to calculate the acidity of the oil in terms of moles of acid, or any other of the usual analytical terms for acid content. In some embodiments, naphthenic acid corrosion occurs when the crude being processed has a TAN above 0.2. In some embodiments, the molybdenum-containing complex is used with a fluid source (e.g. hydrocarbon) with TAN of 0.2 to 20. In some embodiments the fluid source has a TAN of 0.2 to 0.5; 0.5 to 5; 2 to 10; 7 to 15; 10 to 15; 15 to 20.

In some embodiments, the molybdenum-containing complexes or in a composition is applied to a fluid source that contains various sulfur levels. In one embodiment, the fluid source has about 0.1% to about 25%; about 0.1 to about 10%; about 1% to about 10%; or about 6% to about 25% weight/weight (w/w) sulfur.

In some embodiments, the molybdenum-containing complexes or in a composition are used in an amount from about 0.1 ppm to 10,000 ppm; from 0.1 ppm to 3,000 ppm; from about 100 ppm to 1000 ppm; from about 500 ppm to 3,000 ppm; from about 750 ppm to 3,000 ppm; from about 2,000 ppm to 5,000 ppm; from about 3,000 ppm to 5000 ppm; from about 100 ppm to 3,000 ppm; from about 1 ppm to 1000 ppm; from about 1 ppm to 3,000 ppm; from about 10 ppm to 50 ppm; from about 50 ppm to 100 ppm, from 100 pp to 800 ppm, from 150 ppm to 550 ppm; from about 1 ppm to 250 ppm; from about 1 ppm to 50 ppm; from about 1 ppm to 25 ppm; from about 1 ppm to 5 ppm; from about 3 ppm to 25 ppm; from 0.1 ppm to 5 ppm; or from about 0.1 ppm to 1 ppm by weight or volume of the molybdenum-containing complex in a fluid source.

In some embodiments, the molybdenum-containing complexes are introduced at an initial dosage rate of about 1 ppm to about 3,000 ppm and to maintain this level for a time period ranging from 1 hour to 48 hours until the the molybdenum-containing complexes induces the build-up of a corrosion protective coating on the metal surfaces. In other embodiments, the molybdenum-containing complex is dosed at a concentration that is at least double the initial dosage rate of 1 ppm to about 3,000 ppm) for a period of 1 hour to several hours prior to introducing TAN-containing fluids. Once the protective surface is established, the dosage rate needed to maintain the protection may be reduced to at least 1-250 ppm without substantial sacrifice of protection. In other embodiments, the molybdenum-containing complexes is dosed at a concentration that is at least double the initial dosage rate for a period of 1 hour to several hours while simultaneously introducing TAN-containing fluids.

Once the protective surface is established, the dosage rate needed to maintain the protection may be reduced from 1 ppm to 3000 ppm or at least 1 ppm to 1,000 ppm. In some embodiments the dosage for a continuous application of the molybdenum-containing complex into the fluid is 1 ppm-1000 ppm; 1-500 ppm, 1-250 ppm, 100-100 ppm, or 500-1000 ppm without substantial sacrifice of protection.

In some embodiments, the molybdenum-containing complexes provides from about 50-99%, 75-99%, or 75-50% corrosion inhibition for metal containment in contact with a fluid source. In some embodiments, the molybdenum-containing complexes provides from about 50-99% corrosion protection for a metal containment in contact with a fluid source, as determined by a 1018 carbon steel coupon in a coupon test as described in Examples 1-2. In some embodiments, the method provides at least 70% corrosion protection for a 1018 carbon steel coupon test, from about 70-90%, 75-85% or 80-90% wherein the test is characterized by a testing temperature of about 250° C. to 350° C.; a naphthenic acid in paraffin oil with a KOH of about 0.5-12 TAN; a test duration of 2-4 hours; and an corrosion inhibitor dosage of 25 ppm, 50 ppm, 75 ppm, 100 ppm, 175 ppm, 200 ppm, 250 ppm, 300 ppm, 350 ppm, 400 ppm, 500 ppm, or 1,000 ppm, based on total fluid volume.

In some embodiments, the method provides at least 65% protection, from about 65-80%, 70-90%, 75-85% or 80-90% after two hours, at least 85% protection after 8 hours, and about 100% protection 10 hours.

In some embodiments, the molybdenum-containing complex or compositions containing them include other additives such as one or more asphaltene inhibitors, paraffin inhibitors, dispersants, emulsion breakers, antifoams, or any combination thereof. In some embodiments, the molybdenum-containing complex further comprises one or more solvents or a mixture thereof.

In some embodiments the molybdenum-containing complex is introduced into a fluid source by any means suitable for ensuring dispersal of the molybdenum-containing complex through the fluid source being treated and introduced at numerous, different locations throughout a given system. The composition comprising the molybdenum-containing complex can be injected as prepared or formulated in one or more additional solvents, depending upon the application and requirements.

In one embodiment, the composition comprising the molybdenum-containing chemistry is pumped into an oil/gas pipeline using an umbilical line. In some embodiments, capillary string injection systems may be utilized to deliver the composition. U.S. Pat. No. 7,311,144 provides a description of an apparatus and methods relating to capillary injection, the disclosure of which is incorporated into the present application in its entirety. In other embodiments, the composition comprising the one or more molybdenum-containing complex is injected using mechanical equipment such as chemical injection pumps, piping tees, injection fittings, and the like.

Introducing may be achieved also by mixing, blending with mechanical mixing equipment or devices, stationary mixing setup or equipment, magnetic mixing or other suitable methods, other equipment and means known to one skilled in the art and combinations thereof to provide adequate contact and/or dispersion of the composition into the fluid source. The contacting can be made in-line and/or offline. The various components of the composition may be mixed prior to and/or during contact. If needed or desired, the composition or some of its components may be optionally removed or separated mechanically, chemically, or by other methods known to one skilled in the art. One of skill in the art will understand that the methods disclosed herein are not limited in any way by the introduction method, the timing or the location of the introduction.

The molybdenum complexes are used in a method to passivate the surfaces of a process equipment to provide a treated process equipment. The treated process equipment mitigates the corrosion on the metal surfaces. Examples of passivation are described in U.S. Pat. Nos. 4,024,050, 3,522, 093, 6,228,253, 9,845,437, ASTM A-967, and ASTM A-380, which references are incorporated herein by reference in their entirety. In some embodiments, passivation is carried out before the process equipment is used for processing and/or after the process equipment has been cleaned, and referred herein as pre-passivation.

In some embodiments, the molybdenum-containing complexes is introduced into the hydrocarbon feedstock before or during the processing of the hydrocarbon feedstock, and referred here as passivation. In the method to pre-passivate or passivate, in some embodiments, the molybdenum complex is introduce continuously or intermittently.

In some embodiments the molybdenum-containing complex is used with water strippers and waste water strippers, used with petrochemical processes such as styrene, butadiene, acrylonitrile, and ethylene processes. In some embodiments, ethylene acid gas scrubbers and butadiene solvent recovery systems are also end use applications of the molybdenum-containing complex.

The molybdenum-containing complexes are not used in processing equipment such as an engine, hydraulic brake, power steering system, or transmission nor are the molybdenum-containing complexes used as a coolant additive in hydraulic fluid.

The molybdenum-containing complexes are also useful as corrosion inhibitors for other industrial systems. In some embodiments, the molybdenum-containing complexes are used as disclosed in U.S. Provisional Application No. 62/879,877 filed herewith.

In some embodiments, the molybdenum-containing complexes are used in metallurgical industry, mining systems, water reclamation systems, water purification systems, food processing systems (meat, fruit and vegetable), waste treatment systems, municipal sewage and water treatment systems.

EXAMPLES

The following examples are intended to illustrate different aspects and embodiments of the invention and are not to be considered limiting. It will be recognized that various modifications and changes may be made to the experimental embodiments described herein, and without departing from the scope of the claims.

Example 1-High Temperature Corrosion Inhibition

The performance of the test complexes is evaluated via weight loss analysis (corrosion rate) of coupons using the autoclave corrosion testing method.

Table 1 shows the experimental parameters used in high temperature corrosion testing:

TABLE 1

| Experimental Parameters used in High Temperature Corrosion Testing | |
|---|---|
| Experimental Variable | Parameter |
| Temperature | 320° C. |
| Shear rate | 440 rpm after the temperature reaches 320° C. |
| Reaction N2 pressure | 100 PSI @room temperature and ~220 PSI @320° C. |
| Time | 4 hours |
| Autoclave testing medium | Naphthenic acid in paraffin oil (both from Sigma Aldrich) |
| TAN | 11.5 |
| C1018 Metal Coupons | Disc coupons with 1.25-inch diameter and 0.125-inch thickness |
| Pre-passivation dose | 1000 ppm |
| Autoclave inhibitor dose (continuous) | 500, 350, 250, and 175 ppm |

Coupon Pre-Passivation Step 500 mL of paraffin oil solution was placed in a 1 L glass reactor. The paraffin oil solution was heated to 250° C. to which a 1,000 ppm dose of each of the corrosion inhibitors being tested was injected into, and the resulting paraffin oil solution was stirred at 250° C. for 1 hour.

The metal coupons were first weighed on an analytical balance (four-decimal). The metal coupons were then immersed in the paraffin oil that was heated at 250° C. and subjected to continuous nitrogen purging. After 1-hour of passivation, heating was stopped. Once the oil cooled down (<80° C.), the coupons were removed from the oil, washed with toluene and isopropanol, and dried using a nitrogen gas stream.

Autoclave Corrosion Testing

In a 1 L autoclave vessel, a 500 mL solution of paraffin oil (with 11.5 TAN) was added. Pre-passivated C1018 coupons (as described above) were weighed on an analytical balance (four-decimal) and attached to a rotating shaft of the autoclave vessel via a set of ceramic spacers that were held together by a screw. Subsequently, the vessel was sealed and tightened using a set of bolts/screws. The atmosphere inside the vessel was first purged with $N_2$ using three rounds of 100 psi $N_2$ fills/releases. The reactor was then pressurized with $N_2$ to 100 psi and then inserted inside a heating element or mantle. The system was set to rotate at 50 rpm while the vessel was heating to 320° C. Once the target temperature of 320° C. was reached, the rotation rate was increased to 440 rpm and the experiment was run for 4 hours.

Subsequently, the heating mantle was turned off and the motor speed was reduced to 50 rpm. The vessel was allowed to cool for 30 minutes. When the vessel temperature dropped below 150° C., the autoclave was removed from the heating mantle and allowed to cool further inside a hood. Once the vessel temperature dropped below 70° C., the pressure inside the vessel was released, and the coupons were then removed, washed with toluene, and scrubbed with a multi-purpose paper towel. The coupons were then rinsed with toluene, isopropanol, and dried using a stream of $N_2$ gas. The dried coupons were weighed using the same analytical balance used to initially weight pre-passivated C1018 coupons, and the corrosion rate was calculated using equation 1. The vessel was then washed with toluene, isopropanol, and dried in an oven.

The corrosion rate or weight loss was calculated using Equation 1:

$$\text{Corrosion Rate} = \frac{3.45 \times 10^6 \times (\Delta W)}{A \times T \times D} \quad \text{Equation 1}$$

Figure 1:
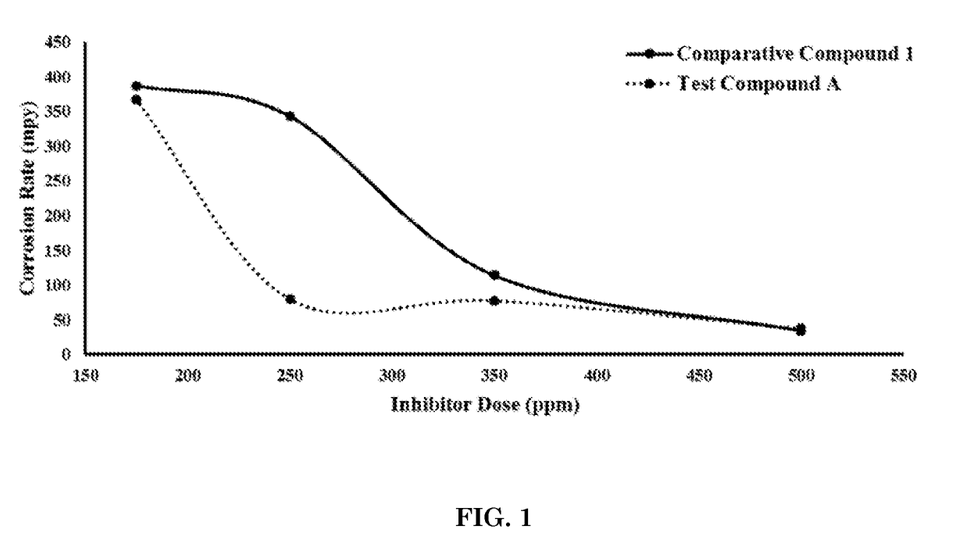
FIG. 1 is a graphical representation of the autoclave dose response profile for Test Complex A compared to Comparative Compound 1 at the same pre-passivation dose for a formulation of an embodiment of the application.

Where
$\Delta W$=weight loss in grams
A=area in $cm^2$,
T=time in hours, and
D=density of the metal in $g/cm^3$ FIG. 1 shows the dose response profile for the Test Complex A (a Mo dialkyldithiophosphate complex) compared to Comparative Compound 1 (a mixture of a mono- and di-alkyl phosphate ester) in the dose range from 175-500 ppm. The results shown in FIG. 1 are the average data of two coupons.

FIG. 1 shows that Test Complex A was more effective at inhibition compared to Comparative Compound 1, particularly in the 175-350 ppm range.

Example 2

The performance of the molybdenum-containing Test Complex A (as described in Example 1) was compared to sulfur-based products in a manner as described in Example 1. The sulfur-based products tested are Comparative Compound 2 (branched alkyl-terminated polysulfide compound) and Comparative Compound 3 (n-alkane-terminated sulfurized compound). Test Complex A was also compared to a known industry standard inhibitor, Comparative Compound 1 (phosphate ester). Blank is the sample with no test complex or comparative compounds.

Figure 2:
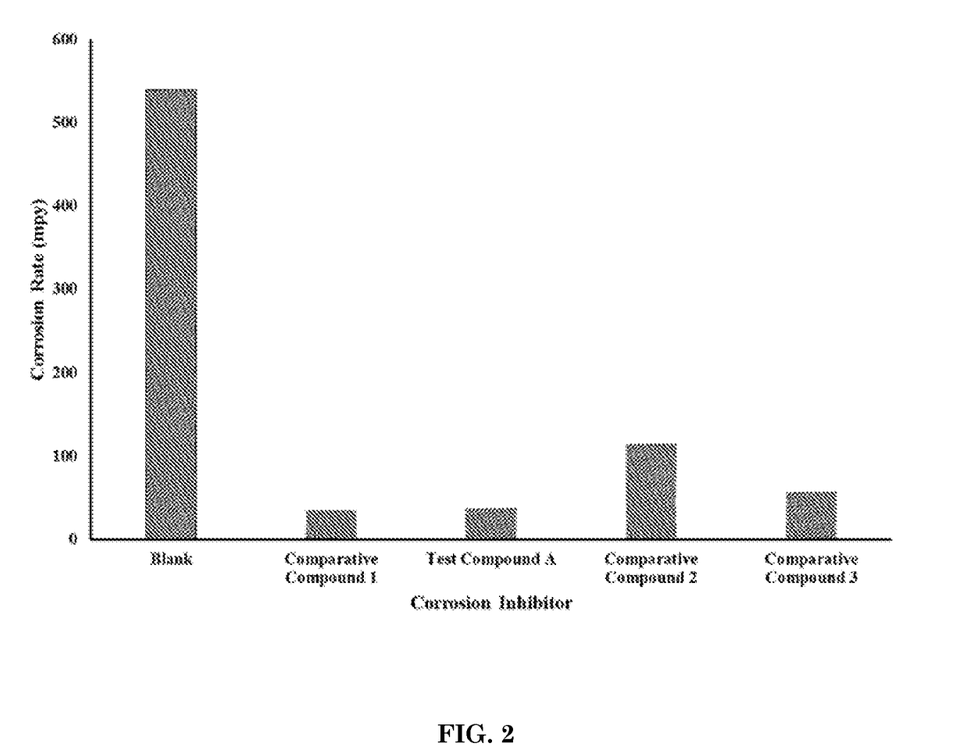
FIG. 2 is a graphical representation of corrosion rates for a formulation of an embodiment of the application.

FIG. 2 depicts the results of such comparison, which shows a better performance of the phosphorous-based product (Test Complex A) relative to those of sulfur (Comparative Compound 2-3) and the phosphate ester. The difference of inhibition rate of Comparative Compound 1 could be attributed to the stronger adherence of the iron phosphate film compared to that of iron sulfide.

Example 3 (Prophetic)

The high temperature corrosion inhibition of Test Complex B (a Mo dialkyldithiocarbamate complex) will be evaluated via weight loss analysis (corrosion rate) of coupons using the autoclave corrosion testing method as described in Example 1. A dose response profile for the Test Complex B will be compared to a Comparative Compound 20 (a mixture of a mono- and di-alkyl phosphate ester) and a Comparative Compound 21 (a mixture of a mono- and di-alkyl carbamates) in the dose range from about 175-500 ppm.

Example 4 (Prophetic)

The performance of the molybdenum-containing Test Complex B (as described in Example 3) will be compared to sulfur-based products in a manner as described in Example 1. The sulfur-based products to be tested are Comparative Compound 22 (branched alkyl-terminated polysulfide compound) and Comparative Compound 3 (n-alkane-terminated sulfurized compound). Test Complex B will also be compared to a known industry standard inhibitor, Comparative Compound 23 (phosphate ester). Blank will be the sample with no test complex or comparative compounds.

The application is further described below with additional non-limiting embodiments:

1. A method of inhibiting corrosion comprising:
introducing into a fluid source containing corrodents at least one molybdenum-containing complex having the formula selected from Formula I, II, III, or Formula I Formuila II wherein $R_1$, $R_2$, $R_3$, and $R_4$, are each a hydrocarbon group and wherein $R_1$, $R_2$, $R_3$, and $R_4$ can be the same or different; and X is oxygen or sulfur and X can be the same or different.

Formula III

Formuila IV wherein $Y^1$ and $Y^2$ are each oxygen, nitrogen or carbon-containing ligands and $Y^1$ and $Y^2$ can be the same or different and X is each oxygen or sulfur, and X can be the same of different from each other.

2. The method of embodiment 1, wherein the introducing is by injecting or pumping.
3. The method as in one of embodiments 1-2, wherein the fluid source contacts a metal containment.
4. The method as in one of embodiments 1-3, wherein the fluid source is in contact with distillation columns, strippers, trays, or piping.
5. The method as in one of embodiments 1-4, wherein the fluid source comprises at least a liquid hydrocarbon fraction.

6. The method of embodiment 5, wherein the hydrocarbon fraction is a distillate.
7. The method as in one of embodiments 1-6, wherein the corrodents comprise at least naphthenic acid, sulfur or combinations thereof.
8. The method as in one of embodiments 1-7, wherein the fluid source comprises a TAN of 0.2 to 20.
9. The method as in one of embodiments 1-8, wherein the fluid source temperature is about 175° C. to 600° C.
10. The method as in one of embodiments 1-9, wherein the molybdenum-containing complex is added to the fluid source from 1 ppm to 3,000 ppm.
11. The method as in one of embodiments 1-10, wherein the molybdenum-containing complex further comprises one or more, asphaltene inhibitors, paraffin inhibitors, dispersants, emulsion breakers, or any combination thereof.
12. The method as in one of embodiments 1-11, wherein the R1, R2, R3, and R4 of formulae I and II comprise thiophosphates, phosphates and polymers thereof.
13. The method as in one of embodiments 1-12, wherein the Y1 and Y2 of formulae III and IV comprise thiocarbamates and polymers thereof.
14. The method as in one of embodiments 1-13, wherein the molybdenum-containing complex comprises a molybdenum dithiocarbamate, dithiophosphate, polymers thereof and combinations thereof.
15. The method of embodiment 14, wherein the molybdenum dithiocarbamate is an alkyldithiocarbamate.
16. The method of embodiment 15, wherein the alkyldithiocarbamate is an ethyl hexyl dithiocarbamate, straight chain C6-C10 alcohols or mixtures thereof.
17. The method of embodiment 14, wherein the molybdenum dithiophosphate is an alkyldithiophosphate.
18. The method of embodiment 17, wherein the alkyldithiophosphate is an ethyl hexyl, straight chain C6-C10 alcohols or mixtures thereof.
19. The method as in one of embodiments 1-18, wherein the molybdenum-containing complex provides at least 70% corrosion protection in a 1018 carbon steel coupon test.
20. A composition comprising at least one molybdenum-containing complex to inhibit corrosion in a fluid source containing corrodents and in contact with a metal containment, the at least one molybdenum-containing complex comprising the formula selected from Formula I, II, II or IV:

Formula I

Formuila II wherein R1, R2, R3, and R4, are each a hydrocarbon group and wherein R1, R2, R3, and R4 can be the same or different; and X is oxygen or sulfur and X can be the same or different.

Formula III

-continued

Formula IV wherein Y¹ and Y² are each oxygen, nitrogen or carbon-containing ligands and Y¹ and Y² can be the same or different and X is each oxygen or sulfur, and X can be the same of different from each other.

21. The composition of embodiment 20, wherein the composition further comprises one or more, asphaltene inhibitors, paraffin inhibitors, dispersants, emulsion breakers, or any combination thereof.

22. The composition as in one of embodiments 20-21, wherein the fluid source is in contact in with distillation columns, strippers, trays, or piping.

23. The composition as in one of embodiments 20-22, wherein the fluid source comprises at least a liquid hydrocarbon fraction.

24. The composition as in one of embodiments 20-23, wherein the hydrocarbon fraction is a distillate.

25. The composition as in one of embodiments 20-24, wherein the corrodents comprise at least naphthenic acid, sulfur or combinations thereof.

26. The composition as in one of embodiments 20-25, wherein the fluid source comprises a TAN of 0.2-20.

27. The composition as in one of embodiments 20-26, wherein the fluid source temperature is 175° C. to 600° C.

28. The composition as in one of embodiments 20-27, wherein the R1, R2, R3, and R4 of formulae I and II comprise thiophosphates, phosphates and polymers thereof.

29. The composition as in one of embodiments 20-28, wherein the Y1 and Y2 of formulae III and IV comprise thiocarbamates and polymers thereof.

30. The composition as in one of embodiments 20-29, wherein the molybdenum-containing complex comprises a molybdenum dithiocarbamate, dithiophosphate, polymers thereof and combinations thereof.

31. The composition of embodiment 30, wherein the molybdenum dithiocarbamate is an alkyldithiocarbamate.

32. The composition of embodiment 31, wherein the alkyldithiocarbamate is an ethyl hexyl dithiocarbamate, straight chain C6-C10 alcohols or mixtures thereof.

33. The composition of embodiment 30, wherein the molybdenum dithiophosphate is an alkyldithiophosphate.

34. The composition of embodiment 33, wherein the alkyldithiophosphate is an ethyl hexyl, straight chain C6-C10 alcohols or mixtures thereof.

35. The composition as in one of embodiments 20-34, wherein the molybdenum-containing complexes are about 1 ppm to 3,000 ppm of the composition.

36. A composition comprising:
a fluid source; and
the at least one molybdenum-containing complex as in one of embodiments 20-35.

37. A treated metal containment comprising:
a metal containment comprising a metal surface; and the fluid source comprising the molybdenum-containing complex as in one of embodiments 20-36, wherein at least a portion of the metal surface is contacted by the fluid source.

38. The treated metal containment of embodiment 37, wherein the metal surface comprises carbon (mild) steel or higher alloy.

39. The treated metal containment as in one of embodiments 37-38, wherein the metal containment comprises a tank, pipe, distillation column strippers, trays, or piping.

40. The treated metal containment as in one of embodiments 37-39, wherein the fluid comprises, gas, liquid hydrocarbon, and optionally water.

41. Use of the molybdenum-containing complex as in one of embodiments 1-40 to inhibit corrosion.

42. Use of the molybdenum-containing complex as in one of embodiments 1-40 to treat a fluid source comprising one or more corrodents and the fluid source in contact with a containment.

43. Use of the molybdenum-containing complex as in one of embodiments 1-40 to inhibit corrosion of a metal containment comprising a fluid source comprising one or more corrodents.

What is claimed is:

1. A method of inhibiting corrosion of a metal containment in a crude oil refining process, wherein the metal containment comprises an acidic fluid source containing crude oil or a fraction thereof and an acidic corrodents, comprising:
introducing into the acidic fluid source at least one molybdenum-containing complex having the formula selected from the group consisting of Formula I, II, III, and IV; wherein the acidic fluid source has a temperature in the range of 175° C. to 600° C.; wherein the acidic corrodents comprise a naphthenic acid and sulfur in the form of hydrogen sulfide, an organic sulfide, a mercaptan, or sulfur dioxide; and wherein each of Formula I, II, III, or IV is given by the following:

Formula I

Formula II wherein $R_1$, $R_2$, $R_3$, and $R_4$, are each a hydrocarbon group and wherein $R_1$, $R_2$, $R_3$, and $R_4$ can be the same or different; and X is oxygen or sulfur and X can be the same or different;

Formula III

Formula IV wherein Y¹ and Y² are each oxygen, nitrogen or carbon-containing ligands and Y¹ and Y² can be the same or different and X is each oxygen or sulfur, and X can be the same of different from each other.

2. The method of claim 1, wherein the acidic fluid source comprises at least a crude oil fraction.

3. The method of claim 1, wherein the acidic corrodents comprise at least naphthenic acid, sulfur or combinations thereof.

4. The method of claim 1, wherein the acidic fluid source comprises a TAN of 0.2 to 20.

5. The method of claim 1, wherein the molybdenum-containing complex is added to the acidic fluid source from 1 ppm to 3,000 ppm.

6. The method of claim 1, wherein the molybdenum-containing complex comprises at least one of a molybdenum dithiocarbamate, a molybdenum dithiophosphate, polymers thereof and combinations thereof.

7. The method of claim 1, wherein the at least one molybdenum-containing complex comprises a molybdenum alkyldithiocarbamate.

8. The method of claim 7, wherein the alkyldithiocarbamate is an ethyl hexyl dithiocarbamate.

9. The method of claim 1, wherein the at least one molybdenum-containing complex comprises a molybdenum alkyldithiophosphate.

10. The method of claim 9, wherein the molybdenum alkyldithiophosphate comprises a molybdenum dialkylthiophosphate, molybdenum ethyl hexyl dithiophosphate, a molybdenum dithiophosphate comprising a straight chain C6-C10 alcohol, or mixtures thereof.

11. The method of claim 1, wherein the molybdenum-containing complex provides at least 70% corrosion protection in a 1018 carbon steel coupon test.

12. A method of inhibiting corrosion of a metal containment in a crude oil refining process, wherein the metal containment comprises an acidic fluid source containing crude oil or a fraction thereof and an acidic corrodent that causes the metal containment to corrode, comprising:
pre-passivating a metal surface of the metal containment to provide a treated, pre-passivated process containment surface, said pre-passivating comprising contacting the metal surface with a corrosion inhibiting, passivating composition comprising at least one molybdenum-containing complex;
contacting the treated, pre-passivated process containment surface with the acidic fluid source; and
introducing into the acidic fluid source at least one molybdenum-containing complex in an amount effective to reduce corrosion associated with the acidic corrodent.

* * * * *

UNITED STATES PATENT AND TRADEMARK OFFICE
CERTIFICATE OF CORRECTION

| | | |
|---|---|---|
| PATENT NO. | : 11,767,596 B2 | |
| APPLICATION NO. | : 16/942194 | |
| DATED | : September 26, 2023 | |
| INVENTOR(S) | : Oussama Zenasni et al. | |

It is certified that error appears in the above-identified patent and that said Letters Patent is hereby corrected as shown below:

On the Title Page

In item (56) Other Publications, Column 2, Line 8, ""M0S2" should be -- "MoS2 --.

In item (56) Other Publications, Column 2, Line 15, "oftemperature" should be -- of temperature --.

In the Claims

Column 18, Claim 1, Line 41, "Formuila" should be -- Formula --.

Column 18, Claim 1, Line 57, "Formuila" should be -- Formula --.

Signed and Sealed this
Second Day of January, 2024

*Katherine Kelly Vidal*
Katherine Kelly Vidal
*Director of the United States Patent and Trademark Office*